US012531074B2

(12) United States Patent
Wang et al.

(10) Patent No.: US 12,531,074 B2
(45) Date of Patent: Jan. 20, 2026

(54) METHOD, SYSTEM, AND MEDIUM OF ADDING ADDITIONAL INFORMATION TO LC3 AUDIO CODE STREAM

(71) Applicant: Barrot Technology Co., Ltd., Beijing (CN)

(72) Inventors: Yao Wang, Beijing (CN); Qiang Li, Beijing (CN); Dongxiang Ye, Beijing (CN); Yong Zhu, Beijing (CN)

(73) Assignee: Barrot Technology Co., Ltd., Beijing (CN)

( * ) Notice: Subject to any disclaimer, the term of this patent is extended or adjusted under 35 U.S.C. 154(b) by 194 days.

(21) Appl. No.: 18/270,484

(22) PCT Filed: Jan. 7, 2021

(86) PCT No.: PCT/CN2021/070549
§ 371 (c)(1),
(2) Date: Jun. 30, 2023

(87) PCT Pub. No.: WO2022/141658
PCT Pub. Date: Jul. 7, 2022

(65) Prior Publication Data

US 2024/0062766 A1 Feb. 22, 2024

(30) Foreign Application Priority Data

Dec. 30, 2020 (CN) ......................... 202011600984.9

(51) Int. Cl.
*G10L 19/02* (2013.01)

(52) U.S. Cl.
CPC .................................... *G10L 19/02* (2013.01)

(58) Field of Classification Search
CPC ..... G10L 19/02; G10L 19/038; G10L 19/022; G10L 25/00; G10L 25/90; H04N 21/2543; H04B 1/665
See application file for complete search history.

(56) References Cited

U.S. PATENT DOCUMENTS 5,008,668 A * 4/1991 Takayama ............... H03M 7/18 341/83
6,349,284 B1 * 2/2002 Park ....................... H04B 1/665 704/500

(Continued)

FOREIGN PATENT DOCUMENTS

CN 1387191 12/2002
CN 1973434 B * 7/2012 ............ G10L 25/00

(Continued)

OTHER PUBLICATIONS

"International Search Report (Form PCT/ISA/210) of PCT/CN2021/070549", mailed on Sep. 15, 2021, with English translation thereof, pp. 1-6.

*Primary Examiner* — Paras D Shah
*Assistant Examiner* — Nadira Sultana
(74) *Attorney, Agent, or Firm* — JCIPRNET

(57) ABSTRACT

The present application discloses a method, system and medium of adding additional information to a LC3 audio code stream. The method comprises: obtaining unused bit space in a LC3 audio encoding process, including: obtaining an single-bit unused space of a current encoding frame in the LC3 audio encoding process, wherein the single-bit unused space is a difference value between an estimate length of a residual encoded bit and an actual length of the residual encoded bit of the current encoding frame in the LC3 audio encoding process; obtaining an multiple-bit unused space of the current encoding frame in the LC3 audio encoding process, wherein the multiple-bit unused space is an unused residual space of the current encoding frame in the LC3 audio encoding process; and adding additional information in the LC3 audio encoding process into the unused bit space, so as to be encoded.

10 Claims, 4 Drawing Sheets

(56) References Cited

U.S. PATENT DOCUMENTS

| | | | | | |
|---|---|---|---|---|---|
| 6,975,254 | B1 * | 12/2005 | Sperschneider | G10L 19/032 704/E19.02 |
| 7,334,051 | B2 * | 2/2008 | Koyata | H04N 21/2543 713/176 |
| 9,009,036 | B2 * | 4/2015 | Valin | G10L 19/038 704/229 |
| 9,236,063 | B2 * | 1/2016 | Duni | G10L 25/90 |
| 2006/0195314 | A1 * | 8/2006 | Taleb | G10L 19/022 704/E19.011 |
| 2017/0142412 | A1 * | 5/2017 | Fuchs | H04N 19/44 |

FOREIGN PATENT DOCUMENTS

| | | | | | |
|---|---|---|---|---|---|
| CN | 106157960 | A | * | 11/2016 | G10L 19/008 |
| CN | 111951815 | | | 11/2020 | |
| CN | 112151046 | | | 12/2020 | |
| WO | 2020164751 | | | 8/2020 | |
| WO | WO-2020164752 | A1 | * | 8/2020 | G10L 19/02 |
| WO | 2020243555 | | | 12/2020 | |

* cited by examiner

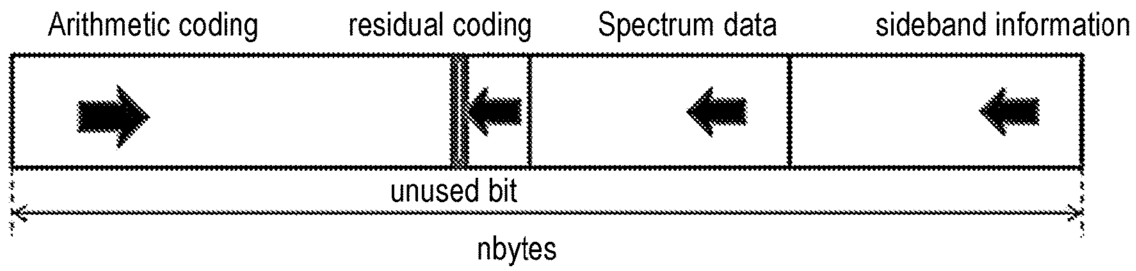

FIG. 1

```
/* Residual bits */
nbits_side = nbits - (8 * bp_side + 8 - log2(mask_side));
nbits_ari = bp * 8;
nbits_ari += 25 - floor(log2(st->range));
if (st->cache >= 0)
{
   nbits_ari += 8;
}
if (st->carry_count > 0)
{
   nbits_ari += st->carry_count * 8;
}
nbits_residual_enc = nbits - (nbits_side + nbits_ari);
if (lsbMode == 0)
{
   nbits_residual_enc = min(nbits_residual_enc, nbits_residual);
   for (k = 0; k < nbits_residual_enc; k++)
   {
      write_bit_backward(bytes, &bp_side, &mask_side, res_bits[k]);
   }
}
else
{
   nbits_residual_enc = min(nbits_residual_enc, nlsbs);
   for (k = 0; k < nbits_residual_enc; k++)
   {
      write_bit_backward(bytes, &bp_side, &mask_side, lsbs[k]);
   }
}

/* Arithmetic Encoder Finalization */
ac_enc_finish(bytes, &bp, &st);
```

FIG. 2

METHOD, SYSTEM, AND MEDIUM OF ADDING ADDITIONAL INFORMATION TO LC3 AUDIO CODE STREAM

CROSS-REFERENCE TO RELATED APPLICATION

This application is a 371 of international application of PCT application serial no. PCT/CN2021/070549, filed on Jan. 7, 2021, which claims priority to Chinese Patent application Ser. No. 20/201,1600984.9, filed on Dec. 30, 2020. The entirety of each of the above mentioned patent applications is hereby incorporated by reference herein and made a part of this specification.

TECHNICAL FIELD

The present invention relates to the technical field of audio codec, and in particular, to a method, system, and medium of adding additional information to a LC3 audio code stream.

BACKGROUND

At present, mainstream Bluetooth audio codecs include: SBC audio codec, which is mandated by the A2DP protocol and is the most widely used; AAC-LC audio codec, which has good sound quality and is widely used, and is many mainstream mobile phones support; aptX series audio codec, which has good sound quality, but which has very high bitrate, and which belongs to a monopolized technology of Qualcomm and is relatively exclusive; and LDAC audio codec, which has good sound quality, but which has also very high bitrate, and which belongs to a monopolized technology of Sony and is also very exclusive. Based on the above, Bluetooth SIG has launched the LC3 audio codec together with many manufacturers, which has the advantages of low latency, high sound quality and coding gain, as well as no patent fees in the Bluetooth field, and thus has attracted the attention of the majority of manufacturers.

In the process of encoding the audio frame, the number of arithmetic bits is estimated according to the residual encoding defined by the LC3 encoder and the final encoding process to obtain the arithmetic remainder estimate value. In the end function of arithmetic encoding, an actual arithmetic encoding number of bits, that is, an arithmetic actual value is used for operation. Wherein, the remainder portion of the arithmetic remainder estimate value is 1 greater than the remainder portion of the arithmetic actual value. Tests have shown that such situation exists between roughly 35%-55% of encoded audio frames. As a result, some bits scattered between frames are not used and thus are wasted.

SUMMARY

For the technical problem of the prior art that there are idle bits and encoding bits are not fully utilized when performing audio encoding, the present invention provides a method, system, and medium of adding additional information to a LC3 audio code stream.

In one aspect of the present invention, the present invention provides a method of adding additional information to a LC3 audio stream, comprising: obtaining unused bit space in a LC3 audio encoding process, including: obtaining an single-bit unused space of a current encoding frame in the LC3 audio encoding process, wherein the single-bit unused space is a difference value between an estimate length of a residual encoded bit and an actual length of the residual encoded bit of the current encoding frame in the LC3 audio encoding process, including: recording an arithmetic remainder estimate value and an arithmetic actual value of the current encoding frame in an encoding process of an audio encoder, wherein the arithmetic remainder estimate value is an estimate value of a number of bits occupied by an arithmetic encoding in the LC3 audio encoding process, and the arithmetic actual value is an actual number of bits actually occupied by a final code stream of the arithmetic encoding; performing a modulo operation on the arithmetic remainder estimate value and the arithmetic actual value, respectively, to obtain a first remainder corresponding to the arithmetic remainder estimate value and a second remainder corresponding to the arithmetic actual value; and recording a bit following a last bit of the arithmetic encoding in an audio frame as the unused single bit if the first remainder is 1 greater than the second remainder; obtaining an multiple-bit unused space of the current encoding frame in the LC3 audio encoding process, wherein the multiple-bit unused space is an unused residual space of the current encoding frame in the LC3 audio encoding process; and adding additional information in the LC3 audio encoding process into the unused bit space, so as to be encoded.

In another aspect of the present invention, the present invention provides a system of adding additional information to a LC3 audio stream, characterized in that it comprises: module for obtaining single-bit unused space, obtaining unused bit space in a LC3 audio encoding process, including: obtaining an single-bit unused space of a current encoding frame in the LC3 audio encoding process, wherein the single-bit unused space is a difference value between an estimate length of a residual encoded bit and an actual length of the residual encoded bit of the current encoding frame in the LC3 audio encoding process, including: recording an arithmetic remainder estimate value and an arithmetic actual value of the current encoding frame in an encoding process of an audio encoder, wherein the arithmetic remainder estimate value is an estimate value of a number of bits occupied by an arithmetic encoding in the LC3 audio encoding process, and the arithmetic actual value is an actual number of bits actually occupied by a final code stream of the arithmetic encoding; performing a modulo operation on the arithmetic remainder estimate value and the arithmetic actual value, respectively, to obtain a first remainder corresponding to the arithmetic remainder estimate value and a second remainder corresponding to the arithmetic actual value; and recording a bit following a last bit of the arithmetic encoding in an audio frame as the unused single bit if the first remainder is 1 greater than the second remainder; module for obtaining multiple-bit unused space, obtaining an multiple-bit unused space of the current encoding frame in the LC3 audio encoding process, wherein the multiple-bit unused space is an unused residual space of the current encoding frame in the LC3 audio encoding process; and module for encoding, adding additional information in the LC3 audio encoding process into the unused bit space, so as to be encoded.

In another aspect of the present invention, the present invention provides a computer-readable storage medium that stores computer instructions wherein the computer instructions are manipulated to execute the method of adding additional information to a LC3 audio code stream according to the above aspect.

The beneficial effect of the present invention is: making full use of the bit space in the encoding process, avoiding the waste of bits, using the unused bits to encode additional information, and improving usage efficiency of the bandwidth of encoding.

BRIEF DESCRIPTION OF THE DRAWINGS

FIG. 1 is a structure diagram of LC3 encoder audio frame.

FIG. 2 is a partial definition code of residual encoding and final encoding are performed in the LC3 encoder.

DETAILED DESCRIPTION

Figure 3:
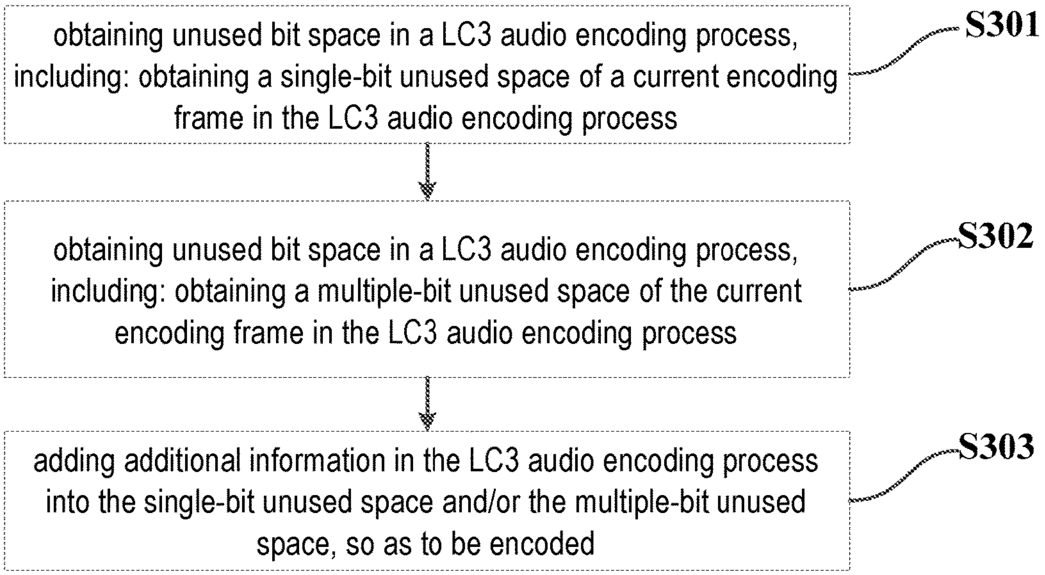
FIG. 3 is a schematic diagram of a method of adding additional information to a LC3 audio code stream in one specific implementation mode.

In order to make the above features and advantages of the present application more comprehensible, the present application will be described clearly and entirely below with reference to the accompanying drawings and specific embodiments. Obviously, the described embodiments are only some embodiments but not all embodiments, and all other embodiments obtained not via inventive labor by persons skilled in the art also belong to the protection scope of the present invention.

Terms "first", "second", "third", "forth" and so on, if existing, in the claims, description, and accompanying drawings of the present application are used to distinguish similar objects, and are not necessarily used to describe a specific sequence. It should be understood that the sequence so used are interchangeable under appropriate circumstances such that the embodiments of the application described herein, for example, can be practiced in sequences other than those illustrated or described herein. Furthermore, the terms "comprising" and "having", as well as any variations thereof, are intended to cover a non-exclusive inclusion, for example, a process, method, system, product or apparatus comprising a sequence of steps or elements is not necessarily limited to the expressly listed instead, may include other steps or elements not explicitly listed or inherent to the process, method, product or apparatus.

When a LC3 audio encoder encodes audio, the structure of the LC3 audio frame is shown in FIG. 1. Therein, the sideband information, spectral data and residual encoding portion are reverse order encoding, and the arithmetic encoding portion is forward encoding.

FIG. 2 shows a partial definition of residual encoding and final encoding in the LC3 audio encoder. The non-integral bit (remainder of 8 bits) portion of the nbits_ari portion, as shown in FIG. 2, comes from the estimation of the 25−floor (log 2(st->range)) section. In the end function of arithmetic encoding, that is, in the last part of forward encoding in actual arithmetic encoding, the non-integer bit part, in the partial frame, will form a calculation error of 1 bit. In nbits_ari estimation formula, the remainder part of the non-integer bit 25−floor (log 2(st->range)) may be larger than the remainder of the actual arithmetic encoding1, and the occurrence probability of such situation is tested to be about 35%~55% between all encoded frames. Therefore, there is a single-bit unused space in the actual encoding process of some audio frames, resulting in the waste of encoding bit space.

In addition, during the encoding process of LC3 audio encoder, the quantized spectral data may have only a small number of frequency bands with energy, or all frequency bands have no energy. For example, when the high-frequency energy value in the encoded audio frame is low and a blank frame appears. Because the arithmetic encoded part occupies less bit space, the residual part itself has a large space, and there are not enough encoded audio samples with energy to generate residual values, resulting in a large amount of residual space that is not used for encoding. In actual audio scenarios, this kind of the multiple-bit unused space mostly appears in the muted part of the front or back of a song.

In the present application, the method of adding additional information to a LC3 audio code stream will make full use of the unused bit space, and by adding additional information including watermark or signature information into the unused bit space, the unused bit space is fully utilized, and the waste of bitrate in the encoding process is avoided.

FIG. 3 is a schematic diagram of a method of adding additional information to a LC3 audio code stream in one specific implementation mode.

As shown in FIG. 3, the method of adding additional information to a LC3 audio code stream in the present application comprises: S301, obtaining unused bit space in a LC3 audio encoding process, including: obtaining a single-bit unused space of a current encoding frame in the LC3 audio encoding process, wherein the single-bit unused space is a difference value between an estimate length of a residual encoded bit and an actual length of the residual encoded bit of the current encoding frame in the LC3 audio encoding process; S302, obtaining a multiple-bit unused space of the current encoding frame in the LC3 audio encoding process, wherein the multiple-bit unused space is an unused residual space of the current encoding frame in the LC3 audio encoding process; and S303, adding additional information in the LC3 audio encoding process into the unused bit space, so as to be encoded.

In this specific implementation mode, obtaining unused bit space in the LC3 audio encoding process firstly. The unused single-bit space is the difference value between the estimated length of the residual encoded bit and the actual length of the residual encoded bit of the current encoding frame in the LC3 audio encoding process, the size of such space is one bit. The multiple-bit unused space is the unused residual space of the current encoding frame in the LC3 audio encoding process, the size of such space is multiple bits. The multiple-bit unused space corresponds to the existence of blank frames in the audio coding process.

Figure 4:
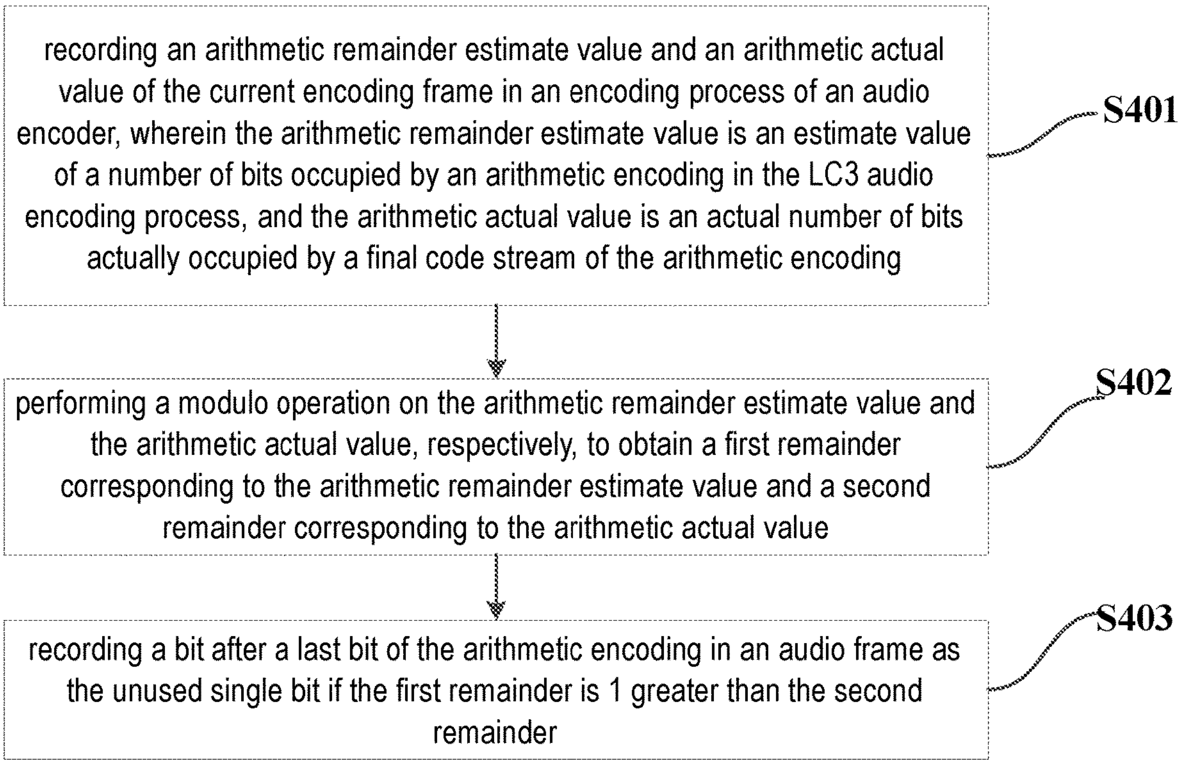
FIG. 4 is a schematic diagram of one specific implementation mode for obtaining a single-bit unused space in a method of adding additional information to a LC3 audio code stream.

FIG. 4 is a schematic diagram of one specific implementation mode for obtaining single-bit unused space of a method of adding additional information to a LC3 audio code stream.

In the specific implementation mode as shown in FIG. 4, obtaining single-bit unused space in a method of adding additional information to the a LC3 audio code stream in the present application comprises: S401, recording an arithmetic remainder estimate value and an arithmetic actual value of the current encoding frame in an encoding process of an audio encoder, wherein the arithmetic remainder estimate value is an estimate value of a number of bits occupied by an arithmetic encoding in the LC3 audio encoding process, and the arithmetic actual value is an actual number of bits actually occupied by a final code stream of the arithmetic encoding; S402, performing a modulo operation on the arithmetic remainder estimate value and the arithmetic actual value, respectively, to obtain a first remainder corresponding to the arithmetic remainder estimate value and a second remainder corresponding to the arithmetic actual value; and S403: recording a bit following a last bit of the arithmetic encoding in an audio frame as the unused single bit if the first remainder is 1 greater than the second remainder.

In the specific implementation mode shown in FIG. 4, obtaining single-bit unused space in a method of adding additional information to the a LC3 audio code stream in the present application comprises: S401, recording an arithmetic remainder estimate value and an arithmetic actual value of the current encoding frame in an encoding process of an audio encoder, wherein the arithmetic remainder estimate value is an estimate value of a number of bits occupied by an arithmetic encoding in the LC3 audio encoding process, and the arithmetic actual value is an actual number of bits actually occupied by a final code stream of the arithmetic encoding.

In this implementation mode, according to a coding definition of a LC3 encoder, in the process of encoding audio, an arithmetic remainder estimate and an arithmetic actual value can be obtained. The arithmetic remainder estimate value is an estimate of the number of bits occupied by the arithmetic encoding during the encoding process. The arithmetic actual value is the actual value of the number of bits occupied by the final stream of the arithmetic encoding. In some of audio frames, the arithmetic remainder estimate value is not the same as the actual arithmetic value, which results in the presence of unused bit space.

In a specific embodiment of the present application, writing a tail portion of actual arithmetic encoding into the code stream, and recording a number of bits actually occupied by a final code stream of the arithmetic encoding as the arithmetic actual value, during obtaining the arithmetic actual value.

In this specific embodiment, according to the definition of LC3 audio, ac_enc_finish operation is performed in advance when obtaining the arithmetic actual value. That is, the actual arithmetic encoding tail is written into the code stream in advance, and the actual number of bits occupied by the final code stream of the arithmetic encoding is recorded as the arithmetic actual value. By performing the ac_enc_finish operation in advance, the actual arithmetic value can be obtained in advance, and then the process of comparing the arithmetic remainder estimate value with the actual arithmetic value can be performed.

In the specific implementation mode shown in FIG. 4, obtaining single-bit unused space in a method of adding additional information to the a LC3 audio code stream in the present application comprises: S402, performing a modulo operation on the arithmetic remainder estimate value and the arithmetic actual value, respectively, to obtain a first remainder corresponding to the arithmetic remainder estimate value and a second remainder corresponding to the arithmetic actual value.

In this specific implementation mode, after obtaining the arithmetic remainder estimate and the arithmetic actual value, the modulo operation is performed respectively to obtain the first remainder corresponding to the arithmetic remainder estimate value and the second remainder corresponding to the arithmetic actual value.

In an example of the present application, in the modulo operation, a division operation is performed by a preset value on the arithmetic remainder estimate value and the predetermined value to respectively obtain the first remainder and the second remainder.

In a specific embodiment mode of the present application, during performing a modulo operation on the arithmetic remainder estimate value and the arithmetic actual value, performing a modulo operation by preset values on the arithmetic remainder estimate value and the arithmetic actual value, respectively, to obtain the first remainder and the second remainder.

In one example of the present application, the preset value can be taken to be 8 when performing the modulo operation. For example, the arithmetic remainder estimate value is 26 and the arithmetic actual value is 25. Performing a modulo on the arithmetic remainder estimate value by the value 8 is, dividing 26 by 8, and the integer part of the result is 3 and the remainder is 2. Performing a modulo on the arithmetic actual value by the value 8 is, dividing 25 by 8, and the integer part of the result is 3 and the remainder is 1. Herein, the first remainder corresponding to the arithmetic remainder estimate value is 2, and the second remainder corresponding to the arithmetic actual value is 1.

In the specific implementation shown in FIG. 4, obtaining single-bit unused space in a method of adding additional information to the a LC3 audio code stream in the present application comprises: S403, recording a bit following a last bit of the arithmetic encoding in an audio frame as the single-bit unused space if the first remainder is 1 greater than the second remainder.

In this specific implementation mode, comparing the first remainder and the second remainder, there is an unused bit in the audio frame of the audio encoding of LC3 if the first remainder is greater than the second remainder by 1. Then, a bit following the last bit of the arithmetic encoding in the audio frame is recorded as the single-bit unused space. As shown in FIG. 1, the position of the single-bit unused space is located at the tail of the arithmetic encoding portion and the head of the residual encoding portion.

In the specific implementation mode shown in FIG. 3, the method of adding additional information to a LC3 audio code stream in the present application comprises: S302, obtaining a multiple-bit unused space of the current encoding frame in the LC3 audio encoding process, wherein the multiple-bit unused space is an unused residual space of the current encoding frame in the LC3 audio encoding process.

In a specific embodiment of the present application, obtaining the multiple-bit unused space of the current encoding frame of the LC3 audio encoding process in a method of adding additional information to the a LC3 audio code stream in the present application comprises: determining a residual encoding bit space of the current encoding frame; performing a residual encoding in the residual encoding bit space, according to a number of residual spectral lines corresponding to the current encoding frame; and determining unused encoding bit space in the residual encoding bit space to be the multiple-bit unused space.

In this specific embodiment, the residual encoding bit space of the current encoding frame is determined at first, in an encoding bit budget for encoding the current encoding frame. Then, according to the residual encoding space needed for the current coding frame to be residual encoded, unused encoding bit space is determined to be the multiple-bit unused space, if there is residual encoding bit space left and there is unused coding bit space. In one example of the present application, most of the bit space is used for performing the spectrum quantization process, that is, for encoding by arithmetic encoding, except for the sideband information which occupies a relatively fixed number of bits in the specific encoding protocol. The remaining bit space is the residual encoding bit space which is left for residual encoding finally. Wherein, the residual encoding bit space may be used up if there are enough residuals to be encoded in the current code frame. However, if the current encoding frame does not have enough residual spectral lines, the encoding of the residuals cannot occupy the entire residual encoding bit space, thus, a residual encoding bit space surplus is created. Such situation is especially obvious if the current encoding frame corresponds to less high frequency energy. Because of the lower energy of the middle and high frequencies, the number of bits occupied by the spectrum quantization data is smaller, and the number of bits left for residuals is relatively large; and the number of residual bits that can be generated is small due to the small value of the quantized data in the middle and high frequency spectrum, so there is more residual bit space left finally.

In one example of the present application, the multiple-bit unused space mostly corresponds to the case that the current encoding frame is silent frame or partially silent frame. When the current encoding frame is silent frame or the part of the current encoding frame is silent frame, and the current encoding frame carries less energy in the middle and high frequencies, there will be the multiple-bit unused space. The specific realization of this process is: when the current encoding frame is encoded in the frequency domain signal, the frequency spectrum signal itself used for arithmetic encoding, which is generated after spectrum quantization, occupies less bit space. In a fixed code rate scenario, because of the smaller number of bits occupied by the aforementioned spectral signal, the number of bits left for residual encoding is higher. Because the effective number of bits of the spectrum signal is less, and the high-frequency signal part is 0 mostly, the quantization error generated during the quantization process is 0 also. When the high frequency energy of the current audio frame is lower, the corresponding quantization error is less than the one when the high frequency energy of the current audio frame is higher, and thus there will be more residual space free. Wherein, the unused residual space is used as the multiple-bit unused space.

Figure 5:
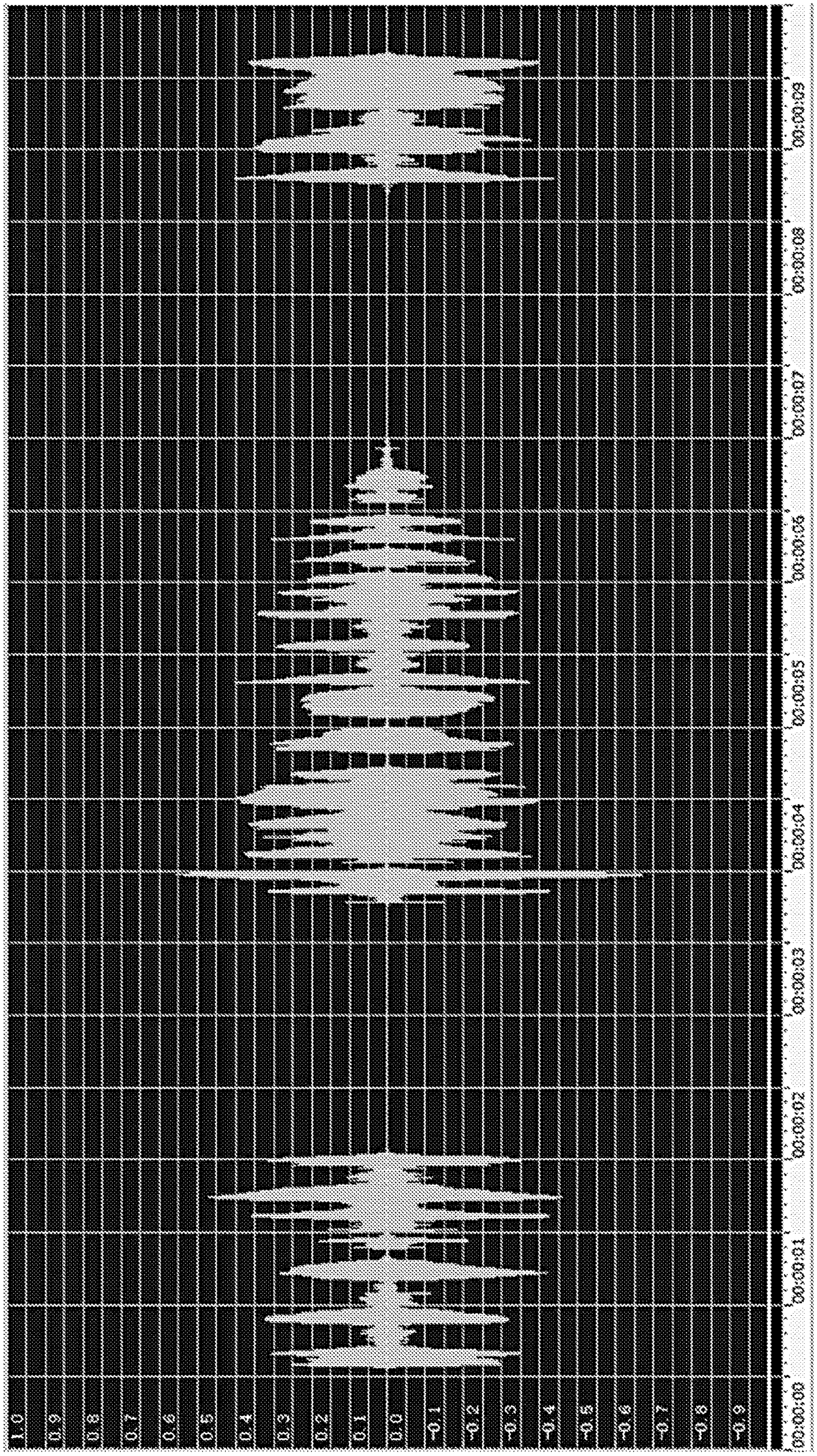
FIG. 5 is a schematic diagram of blank frames in encoded audio frames.

The unused bit space in the LC3 audio encoding process includes the single-bit unused space and the multiple-bit unused space. Wherein, the multiple-bit unused space is the unused residual bit space in the LC3 audio encoding process, which corresponds to the blank frame in the encoded audio frame or the encoding bit space corresponding to the blank frame in the encoded audio frame. Wherein, the blank frames in the encoded audio frame are shown in FIG. 5. The multiple-bit unused space corresponding to the blank frames is obtained by identifying the blank frames in the audio encoding process, and the bandwidth usage efficiency of the coding process is improved by using the multiple-bit unused space to encode the extra information in the encoding process.

In the specific implementation mode shown in FIG. 3, the method of adding additional information to a LC3 audio code stream in the present application comprises: S303, adding additional information in the LC3 audio encoding process into the single-bit unused and/or the multiple-bit unused space, so as to be encoded.

In this specific implementation mode, when encoding an audio frame, additional information from the LC3 audio encoding process is added to the unused bit space, and the unused bit space is used to encode additional information after obtaining the single-bit unused space and/or the multiple-bit unused space, so as to achieve full utilization of the unused bits. More information is entrained during encoding, so as to improve the efficiency of encoding.

In a specific embodiment of the present application, during encoding additional information in the LC3 audio encoding process using unused bit space, the additional information is split to obtain a bitstream of the additional information, and the bitstream is filled into the unused bit space, wherein the additional information includes watermark and/or signature information.

In this specific embodiment, a segment of encoded audio includes multiple encoded audio frames, wherein the unused bits are present in 35%-55% of the encoded audio frames. When adding additional information, the additional information is split into bit streams, and then the bit streams are added into the individual unused bits to achieve the addition of the additional information. Wherein the single-bit unused space is mainly used for residual encoding in the audio encoding process. Compared with the standard encoding scheme, by using the single-bit unused space, an extra bit of residual data can be put into the encoding, and the audio quality can be improved. In addition, for the multiple-bit unused space, it is mainly used for the residual space of the current encoding frame in LC3 audio encoding process, and the extra information added is non-residual data, which can encode the entrained information, thus improve the efficiency of audio encoding.

In a specific embodiment of the present application, when using a decoder to decode a code stream which is added the additional information, bits corresponding to the actual length of the residual encoded bit for decoding are used.

In this specific embodiment, unused bit space is identified in the encoded audio frame, the additional information which includes watermark or signature information is added to the unused bits at the encoding side, and adjustments for adaptation are needed when decoding the audio at the decoding side. In the multiple residual value schemes, since the prepared residuals prepared for residual encoding are larger, it is only needed to fill an additional residual value, which was originally truncated and has higher frequency, on the coding side. While the decoder side needs to be modified by eliminating the use of the estimation formula 25−floor (log 2(st->range)) and instead using the tail of the actual arithmetic decoding as the length value of the actual arithmetic decoding, subtracting the sideband information length and the actual value of the arithmetic encoding from the entire number of bits, so as to obtain the actual residual length. This is shown in FIG. 1.

In a specific embodiment of the present application, by setting a signature portion into an audio frame including the unused bit space, the decoder decodes the audio frame accordingly.

In this specific implementation mode, in order to avoid reading wildcard wild values (meaningless values where 0 or 1 occur randomly) from a stream encoded by an LC3 encoder that does not implement the present patent, a synchronization word check section can be set up firstly in the frames that appear with unused bits ahead of them. The LC3 decoder implementing the present application learns, from the signature information stitched together from the unused bits in these preceding frames during the decoding of consecutive frames, that the subsequent frames will carry additional complete residual bits. Then the upgrade work of the standard LC3 decoder can be realized, so that it can be compatible with the established standard LC3 encoder and the complete residual LC3 encoder at the same time.

In an example of the present application, information is added into the code stream at the encoder side, and the corresponding decoding is performed at the decoder side to recognize the added information. Hereinafter, the decoding process at the decoder side is briefly explained.

The decoder gets the lastnz value from the sideband information of each frame firstly, that is, the last non-zero spectral line number, because of the spectral lines exceeding lastnz are quantized to 0, which represents there is no residual. Then the actual residual value is less than or equal to the lastnz value. After the arithmetic decoding is done, the remaining residual space is obtained; and the sequence of quantized spectral line values is also obtained. Then the processing from n=0 to n=lastnz is done sequentially from low frequency to high frequency: if the corresponding nth sample value of the spectrum quantization is non-zero, it means that the spectrum sub-band corresponding to this value may carry residuals; and if there is still a place in the actual residual space, one bit is read as the nth residual sample, and so on. By processing the spectral line number from 0 to lastnz, until the residual space is read out; or the n value is taken to lastnz until the residual values corresponding to each non-zero spectrum quantization are all taken. The remaining unread residual bit space is the unused bit space which is used for adding additional information into the LC3 audio code stream.

In addition, because of the standard encoder does not define rules on these unused bits, the bits in this part are wildcard wild values, which is any possible combination of values 0 or 1. In order for the decoder to recognize this part of the bit stream and determine whether the part is a wild value or a meaningful extra information added at the time of encoding, it is possible to be marked by synonyms, checksums and so on, so that the newly added extra information is recognized at the decoder side and is decoded smoothly.

The method of adding additional information to a LC3 audio code stream of this application avoids the encoding waste of the unused single-bit unused space and multiple-bit unused space caused by performing estimated arithmetic encoding, meanwhile, the amount of encoding operations is not increased, and when decoding, the actual number of bits at the time of decoding are used, resulting in reducing some of the operations. During adding additional information, including signatures or watermarking schemes, additional information can be entrained to the decoder side based on unused bits. In the full residual encoding scheme, more higher frequency residual bits are entrained to the decoder side due to less rounding of the residual values, which will improve some of the sound quality. Strict compatibility with standard encoders and decoders conforming to the LC3 specification is maintained during the encoder and decoder modification process.

Figure 6:
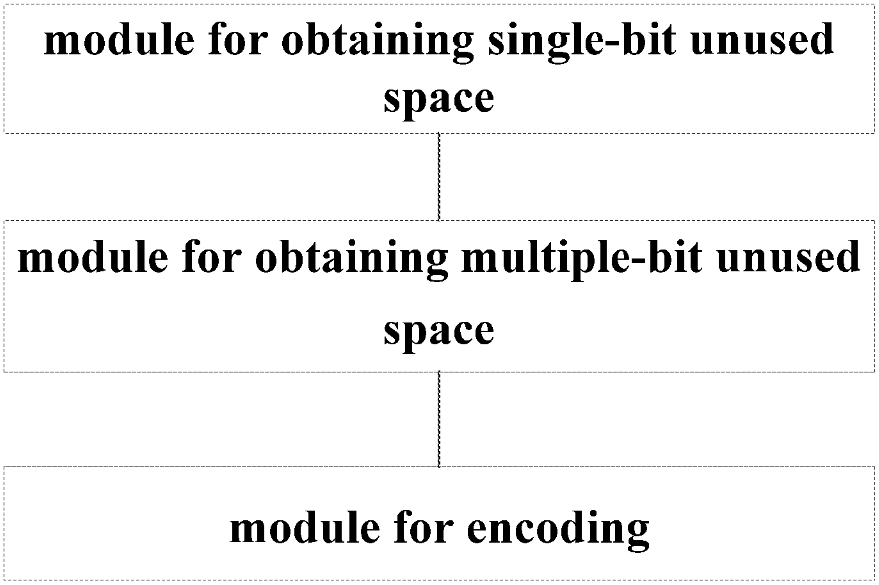
FIG. 6 is a schematic diagram one specific implementation mode of a system of adding additional information to a LC3 audio code stream.

FIG. 6 is a schematic diagram of the system of adding additional information to a LC3 audio code stream.

In the specific implementation mode as shown in FIG. 6, the system of adding additional information to a LC3 audio code stream comprises: module for obtaining single-bit unused space, obtaining an single-bit unused space of a current encoding frame in the LC3 audio encoding process, wherein the single-bit unused space is a difference value between an estimate length of a residual encoded bit and an actual length of the residual encoded bit of the current encoding frame in the LC3 audio encoding process, including: recording an arithmetic remainder estimate value and an arithmetic actual value of the current encoding frame in an encoding process of an audio encoder, wherein the arithmetic remainder estimate value is an estimate value of a number of bits occupied by an arithmetic encoding in the LC3 audio encoding process, and the arithmetic actual value is an actual number of bits actually occupied by a final code stream of the arithmetic encoding; performing a modulo operation on the arithmetic remainder estimate value and the arithmetic actual value, respectively, to obtain a first remainder corresponding to the arithmetic remainder estimate value and a second remainder corresponding to the arithmetic actual value; and recording a bit following a last bit of the arithmetic encoding in an audio frame as the unused single bit if the first remainder is 1 greater than the second remainder; module for obtaining multiple-bit unused space, obtaining multiple-bit unused space of the current encoding frame in the LC3 audio encoding process, wherein the multiple-bit unused space is an unused residual space of the current encoding frame in the LC3 audio encoding process, and the module obtains a blank frame in the LC3 audio encoding process, and encoded bits corresponding to the blank frame is a multiple-bit unused space; and module for encoding, adding additional information in the LC3 audio encoding process into the single-bit unused space and/or the multiple-bit unused space, so as to be encoded.

In an embodiment of the present application, in the module for obtaining multiple-bit unused space, the middle and high frequency energy corresponding to the current encoding frame is detected; and if the middle and high frequency energy is less than an energy threshold, the unused residual space corresponding to the current encoding frame that has undergone a spectrum quantization process is determined to be the multiple-bit unused space.

Herein, because of the audio frames carry less energy in the middle and high frequencies, a number of bits used for arithmetic encoding of the spectrum signal coding is smaller, and thus the number of bits left for the residual space itself is higher in the fixed code rate scenario. Furthermore, since the residual is the quantization error of the spectrum signal, in the case that the energy of the spectrum signal itself is lower, the number of spectral lines whose quantization error is non-zero will obviously also be lower. As a result, a number of residual spectral lines that can be encoded reduce, and finally, the multiple-bit unused space in the residual space becomes more.

By obtaining the unused bit space in the current audio frame, including the single-bit unused space and the multiple-bit unused space, adding the extra information in the encoding process into the unused bit space, and encoding the extra information, the bit space in the encoding process is fully used, the waste of bits is avoided; and by using the unused bit space to encode the extra information, the bandwidth usage efficiency of the encoding is improved.

In a specific embodiment of the present application, a computer-readable storage medium that stores computer instructions wherein the computer instructions are manipulated to execute the method of adding additional information to a LC3 audio code stream according as described in any above embodiment. Therein, the storage medium may be directly in hardware, in a software module executed by a processor, or in a combination of both.

The software module may reside in RAM memory, flash memory, ROM memory, EPROM memory, EEPROM memory, registers, hard disk, loadable disk, CD-ROM, or any other form of storage media known in the art. The exemplary storage medium is coupled to the processor such that the processor can read information from the storage medium and write information to the storage medium.

The processor can be a central processing unit (English: Central Processing Unit, abbreviated: CPU), but also other general-purpose processor, digital signal processor (English: Digital Signal Processor, abbreviated: DSP), special-purpose integrated circuit (English: Application Specific Integrated Circuit, referred to as: ASIC), Field Programmable Gate Array (English: Field Programmable Gate Array, referred to as: FPGA) or other programmable logic devices, discrete gate or transistor logic, discrete hardware components or any combination thereof, etc. The general purpose processor may be a microprocessor, but in alternative embodiments, the processor may be any conventional processor, controller, microcontroller or state machine. The processor may also be implemented as a combination of computing devices, such as a combination of a DSP and a microprocessor, a plurality of microprocessors, one or more microprocessors in combination with a DSP core, or any other such configuration. In alternative embodiments, the storage medium may be integral with the processor. The processor and the storage medium may reside in an ASIC, and the ASIC may reside in a user terminal. In alternative embodiments, the processor and the storage medium may reside in the user terminal as discrete components.

In a specific embodiment of the present application, a computer device comprising a processor and a memory, the memory storing computer instructions, wherein: the processor operates the computer instructions to perform the method described in any of the embodiments for adding additional information to an LC3 audio code stream as described in any above embodiment.

In the embodiments provided in this application, it should be understood that the disclosed apparatus and method, may be implemented in other ways. For example, the above described embodiments of the apparatus are merely schematic, e.g., the division of units, which is only a logical functional division, can be divided in other ways when actually implemented, e.g., multiple units or components can be combined or can be integrated into another system, or some features can be ignored, or not implemented. On another point, the mutual coupling or direct coupling or communication connection shown or discussed may be indirect coupling or communication connection through some interface, device or unit, which may be electrical, mechanical or other forms.

The units illustrated as separate components may or may not be physically separated, and the components shown as units may or may not be physical units, i.e., they may be located in one place or may be distributed to a plurality of network units. Some or all of these units can be selected according to actual needs to achieve the purpose of this embodiment solution.

The above is only an example of the present application, not to limit the scope of the patent. Any equivalent structural transformation using the contents of the specification of the present application and the accompanying drawings, or direct or indirect application in other related technical fields, are included in the scope of patent protection of the present application.

What is claimed is:

1. A method of adding additional information to a Low Complexity Communication Codec (LC3) audio code stream, comprising:

obtaining unused bit space in a LC3 audio encoding process, including:

obtaining a single-bit unused space of a current encoding frame in the LC3 audio encoding process, wherein the single-bit unused space is a difference value between an estimate length of a residual encoded bit and an actual length of the residual encoded bit of the current encoding frame in the LC3 audio encoding process, including:

recording an arithmetic remainder estimate value and an arithmetic actual value of the current encoding frame in an encoding process of an audio encoder, wherein the arithmetic remainder estimate value is an estimate value of a number of bits occupied by an arithmetic encoding in the LC3 audio encoding process, and the arithmetic actual value is an actual number of bits actually occupied by a final code stream of the arithmetic encoding;

performing a modulo operation on the arithmetic remainder estimate value and the arithmetic actual value, respectively, to obtain a first remainder corresponding to the arithmetic remainder estimate value and a second remainder corresponding to the arithmetic actual value; and recording a bit following a last bit of the arithmetic encoding in an audio frame as the single-bit unused space if the first remainder is 1 greater than the second remainder; and obtaining a multiple-bit unused space of the current encoding frame in the LC3 audio encoding process, wherein the multiple-bit unused space is an unused residual space of the current encoding frame in the LC3 audio encoding process; and adding additional information in the LC3 audio encoding process into the unused bit space, so as to be encoded.

2. The method of adding additional information to the LC3 audio code stream according to claim 1, wherein the obtaining the multiple-bit unused space of the current encoding frame in the LC3 audio encoding process comprises:

determining a residual encoding bit space of the current encoding frame;

performing a residual encoding in the residual encoding bit space, according to a number of residual spectral lines corresponding to the current encoding frame; and determining unused encoding bit space in the residual encoding bit space to be the multiple-bit unused space.

3. The method of adding additional information to the LC3 audio code stream according to claim 1, wherein writing a tail portion of actual arithmetic encoding into the code stream, and recording a number of bits actually occupied by a final code stream of the arithmetic encoding as the arithmetic actual value, during obtaining the arithmetic actual value.

4. The method of adding additional information to the LC3 audio code stream according to claim 1, wherein performing a modulo operation by preset values on the arithmetic remainder estimate value and the arithmetic actual value, respectively, to obtain the first remainder and the second remainder.

5. The method of adding additional information to the LC3 audio code stream according to claim 1, wherein splitting the additional information to obtain a bitstream of the additional information, and filling the bitstream into the unused bit space, wherein the additional information includes watermark and/or signature information.

6. The method of adding additional information to the LC3 audio code stream according to claim 1, further comprises:

using bits corresponding to the actual length of the residual encoded bit for decoding when using a decoder to decode a code stream with the additional information.

7. The method of adding additional information to the LC3 audio code stream according to claim 6, wherein setting a signature portion into an audio frame including the unused bit space, such that the decoder decodes the audio frame accordingly.

8. A system of adding additional information to a Low Complexity Communication Codec (LC3) audio code stream, comprising:

a processor and a memory storing computer instructions, wherein when the computer instructions are loaded by the processor, the processor is configured to:

obtaining single-bit unused space, configured to obtain an single-bit unused space of a current encoding frame in the LC3 audio encoding process, wherein the single-bit unused space is a difference value between an estimate length of a residual encoded bit and an actual length of the residual encoded bit of the current encoding frame in the LC3 audio encoding process, including: recording an arithmetic remainder estimate value and an arithmetic actual value of the current encoding frame in an encoding process of an audio encoder, wherein the arithmetic remainder estimate value is an estimate value of a number of bits occupied by an arithmetic encoding in the LC3 audio encoding process, and the arithmetic actual value is an actual number of bits actually occupied by a final code stream of the arithmetic encoding; performing a modulo operation on the arithmetic remainder estimate value and the arithmetic actual value, respectively, to obtain a first remainder corresponding to the arithmetic remainder estimate value and a second remainder corresponding to the arithmetic actual value; and recording a bit following a last bit of the arithmetic encoding in an audio frame as the unused single bit if the first remainder is 1 greater than the second remainder;

obtaining multiple-bit unused space, configured to obtain multiple-bit unused space of the current encoding frame in the LC3 audio encoding process, wherein the multiple-bit unused space is an unused residual space of the current encoding frame in the LC3 audio encoding process; and encoding, configured to add additional information in the LC3 audio encoding process into the unused bit space, so as to be encoded.

9. The system of adding additional information to the LC3 audio code stream according to claim 8, wherein in the obtaining multiple-bit unused space, middle and high frequency energy corresponding to the current encoding frame is detected; and if the middle and high frequency energy is less than an energy threshold, the unused residual space corresponding to the current encoding frame that has undergone a spectrum quantization process is determined to be the multiple-bit unused space.

10. A non-transitory machine readable storage medium that stores computer instructions wherein the computer instructions are manipulated to execute the method of adding additional information to the LC3 audio code stream according to claim 1.

* * * * *